UNITED STATES PATENT OFFICE.

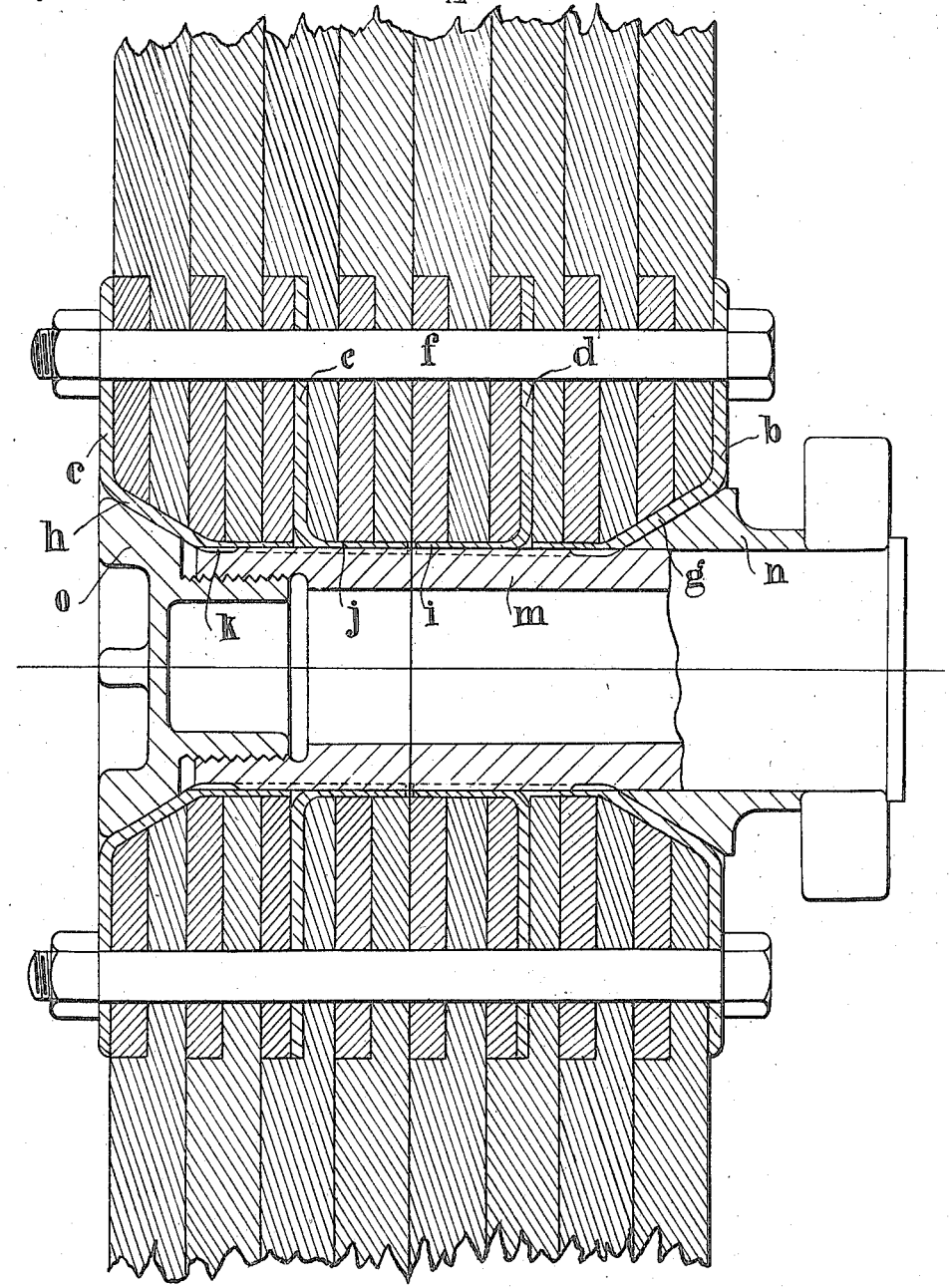

JOHN VERNON PUGH, OF COVENTRY, ENGLAND, ASSIGNOR TO RUDGE-WHITWORTH LIMITED, OF COVENTRY, ENGLAND.

AIR-SCREW BOSS AND ITS ATTACHMENT TO PROPELLER-SHAFTS.

1,263,801. Specification of Letters Patent. Patented Apr. 23, 1918.

Application filed May 15, 1917. Serial No. 168,818.

*To all whom it may concern:*

Be it known that I, JOHN VERNON PUGH, a subject of the King of Great Britain and Ireland, and residing at Rudge Works, Crow Lane, Coventry, in the county of Warwick, England, have invented certain new and useful Improvements in Air-Screw Bosses and Their Attachments to Propeller-Shafts, of which the following is a specification.

This invention relates to an improved construction of boss for air propellers, and particularly for propellers of the type formed of a series of laminæ of wood or the like built up, one upon the other and attached together such as by gluing under pressure.

The object of the invention is to provide means whereby the stresses to which the parts are subjected in transmitting the power from the revolving shaft to the propeller are more evenly distributed throughout the material of the boss.

The invention consists in a screw propeller formed of readily strained material, such as wood, and protected at its juncture with the driving shaft by metallic or like end facings for the boss, in which one or more additional internal metal members are positioned in the material of the boss between the ends thereof so as to engage the shaft and distribute the driving stress more equally.

The invention also consists in improvements in wooden or like screw propeller bosses as hereinafter described.

The accompanying drawing shows by way of example one way in which the invention may be carried into effect.

In the drawing, A represents the boss of a wooden air propeller built up of a number of laminæ or boards $a' \ldots a'$, the laminæ being connected together by gluing under pressure in the ordinary manner.

In addition to the usual facing flanges $b$ and $c$ at each end of the boss a plurality, in the present instance two intermediate flanges $d$ and $e$ are also provided, these flanges being inserted during the building up of the laminæ and being set co-axial with the end flanges and the whole held firmly in position by a series of bolts $f$ passing right through the flanges and the laminæ.

The outer facing flanges $b$ and $c$ are provided with tubular central portions $g$ and $h$ which are frusto-conical in form adjacent to the flat portion of the flange and cylindrical in the remainder of their length. The flanges $d$ and $e$ are provided with cylindrical central portions $i$ and $j$ which coincide in diameter and are set co-axial with the cylindrical portions of the flanges $b$ and $c$. The lengths of the central tubular portions of the flanges are such that they form a complete lining or bushing through the central hole of the propeller boss which is to receive the driving shaft.

The hereinbefore-mentioned bushing is provided on its internal cylindrical surface with a plurality, say 10, of serrations $k$ which are engaged by complementary ridges $l$ formed upon the surface of the propeller shaft $m$.

The propeller shaft $m$ is provided with a conical shoulder or abutment $n$ for engaging the coned surface of the portion $g$ of the flange $b$ and a retaining nut $o$ of a self-tightening type may be provided at the outer end of the propeller shaft to hold the propeller firmly in position.

The number and form of the internal flanges may be varied and other modifications introduced without in any way departing from the spirit of this invention.

Having now described my invention, what I claim as new and desire to secure by Letters Patent is:—

1. In combination in a screw propeller hub formed of readily strained material, such as wood, and protected at its juncture with the driving shaft by metallic or like end facings for the boss, one or more additional internal metal members positioned in the material of the boss between the ends thereof so as to engage the shaft and distribute the driving stress more equally.

2. In combination in a screw propeller hub according to claim 1, and having a laminated wooden or like boss, a flange firmly gripped between the laminæ and having co-axial tubular portions forming a central bushing which engages the shaft by driving means such as complementary ridges and serrations.

3. In combination in a screw propeller hub formed of fibrous material such as wood, a metal bushing for attachment to a driving shaft and means positioned between the ends of said bushing radiating therefrom into said fibrous material to facilitate the driving thereof.

4. In combination in a screw propeller hub formed of fibrous material such as wood, a metal bushing for attachment to a driving shaft, means radiating from each end of said bushing to effect a driving attachment to said propeller and additional driving means positioned in the axial length of said bushing for engaging said fibrous material in at least one intervening position.

5. In combination in a screw propeller hub formed of fibrous material such as wood, a metal bushing for attachment to a driving shaft, a flange spreading from each end of said bushing over the faces of a central boss of said propeller and at least one intermediate flange spreading from said bushing to engage said material between the ends of the boss and distribute the driving stresses.

6. In combination in a screw propeller hub formed of fibrous material such as wood, a metal bushing for attachment to a driving shaft, a flange spreading from each end of said bushing over the faces of a central boss of said propeller, two additional flanges springing from said bushing and sandwiched in the material of said boss between the ends thereof and a series of bolts passing through said flanges arranged around and parallel to said shaft to hold the material of said boss tightly gripped between said flanges.

7. In combination in a screw propeller hub formed of a series of laminæ of wood, a metal bushing for attachment to a driving shaft and means positioned between the ends of said bushing radiating therefrom into said fibrous material to facilitate the driving thereof.

8. In combination in a screw propeller hub formed of a series of laminæ of wood, a metal bushing for attachment to a driving shaft, means radiating from each end of said bushing to effect a driving attachment with said fibrous material and additional driving means positioned between said laminæ in the axial length of said bushing for engaging said fibrous material in at least one intervening position.

9. In combination in a screw propeller hub formed of a series of laminæ of wood, a metal bushing for attachment to a driving shaft, a flange spreading from each end of said bushing over the faces of a central boss of said propeller and at least one intermediate flange springing from said bushing and positioned between said laminæ to engage the material between the ends of the boss and distribute the driving stresses.

10. In combination in a screw propeller hub formed of a series of laminæ of wood, a metal bushing for attachment to a driving shaft, a flange spreading from each end of said bushing over the faces of a central boss of said propeller, two additional flanges springing from said bushing and sandwiched between pairs of said laminæ and a series of bolts passing through said flanges arranged around and parallel to said shaft to hold the material of said boss tightly gripped between all said flanges.

11. In combination in a screw propeller hub formed of a series of laminæ of wood, a metal bushing formed of a plurality of flanged tubular members of which the flanges are positioned between pairs of said laminæ and the tubular portions are arranged co-axially to effect engagement with a driving shaft, and a series of bolts passing through said flanges and laminæ arranged around and parallel to said shaft to hold the material of said propeller tightly gripped between all said flanges.

In testimony whereof, I have affixed my signature.

JOHN VERNON PUGH.